United States Patent
Oguma et al.

(12) 
(10) Patent No.: US 6,374,165 B2
(45) Date of Patent: Apr. 16, 2002

(54) RAILWAY INFORMATION TRANSMISSION METHOD AND SYSTEM

(75) Inventors: Kenji Oguma; Atsushi Kawabata; Korefumi Tashiro, all of Hitachi; Michio Fujiwara, Hitachinaka; Shinya Tanifuji, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/819,706

(22) Filed: Mar. 29, 2001

Related U.S. Application Data (63) Continuation of application No. 09/254,181, filed as application No. PCT/JP96/02502 on Sep. 4, 1996, now Pat. No. 6,230,086.

(51) Int. Cl.⁷ .................................................. G06F 7/00
(52) U.S. Cl. .......................... 701/19; 701/20; 340/508; 246/1 R; 246/2 R; 246/34 B
(58) Field of Search ..................... 701/19, 20; 246/1 R, 246/2 R, 3, 5, 13, 14, 15, 34 B; 340/825.69, 825.72, 508, 531, 534, 535

(56) References Cited

U.S. PATENT DOCUMENTS

| 5,420,883 A | 5/1995 | Swensen et al. ............. 375/200 |
| 6,230,086 B1 * | 5/2001 | Oguma et al. ................. 701/19 |

\* cited by examiner

*Primary Examiner*—Yonel Beaulieu
(74) *Attorney, Agent, or Firm*—Antonelli, Terry, Stout & Kraus, LLP (57) ABSTRACT

In a railway information transmission method and system wherein information is transmitted by a consecutive transmission mode between on-vehicle control equipment and ground control equipment, a redundant code which is updated in accordance with a predetermined procedure every transmission processing is affixed to information to-be-communicated, the information being then transmitted, and on a reception side, a logical operation is performed on the redundant code which is contained in the received information and a redundant code which is created on this side and which is updated in a predetermined procedure. Thus, the trouble of a transmission path can be simply found, and further, the safety of train service based on an automatic train control or the like can be enhanced.

26 Claims, 6 Drawing Sheets

| PROCESSING NUMBER OF TIMES | COUNTER CONTENT | REDUNDANT CODE |
|---|---|---|
| 1 | 0 | 00110 |
| 2 | 1 | 00011 |
| 3 | 2 | 00101 |
| 4 | 3 | 01001 |
| 5 | 4 | 01010 |
| 6 | 5 | 01100 |
| 7 | 6 | 10001 |
| 8 | 7 | 10010 |
| 9 | 8 | 10100 |
| 10 | 9 | 11000 |
| 11 | 0 | 00110 |
| 12 | 1 | 00011 |
| 13 | 2 | 00101 |
| 14 | 3 | 01001 |
| 15 | 4 | 01010 |
| 16 | 5 | 01100 |
| ⋮ | ⋮ | ⋮ |

| TABLE NO. | TABLE CONTENT |
|---|---|
| 0 | 00110 |
| 1 | 00011 |
| 2 | 00101 |
| 3 | 01001 |
| 4 | 01010 |
| 5 | 01100 |
| 6 | 10001 |
| 7 | 10010 |
| 8 | 10100 |
| 9 | 11000 |

RAILWAY INFORMATION TRANSMISSION METHOD AND SYSTEM

This is a continuation of application Ser. No. 09/254,181, filed Mar. 2, 1999, now U.S. Pat. No. 6,230,086 which is a national stage of PCT/JP96/02502 filed Sep. 4, 1996.

BACKGROUND OF THE INVENTION

The present invention relates to a railway information transmission method and system for readily sensing trouble on a transmission path in a railway information transmission system wherein information is transmitted between equipment on the ground and equipment on a train by a consecutive transmission mode.

The transmission modes used in a railway system between on-vehicle control equipment on a train and control equipment on the ground include a consecutive transmission mode and a point transmission mode. With the consecutive transmission mode, the same information is repeatedly transmitted to the train at predetermined time intervals, thereby to ensure the reliability of the information transmission for the reason, for example, that trouble with the equipment can be detected easily from the interruption of transmission of the transmission information.

An example of train control based on the consecutive transmission mode, such as is used at present, is represented by the conventional automatic train control system (ATC system). In this type of system, a control method for establishing the speed limit of each section along a track is based on an analog information transmission wherein speed limit information is transferred to the train by transmitting and receiving a signal having a frequency corresponding to the speed limit at the particular section along the track.

In contrast, the official gazette of Japanese Patent Application Laid-open No. 128760/1991 discloses, by way of example, a digital information transmission method wherein information is transferred in such a way that a signal wave obtained by modulating speed limit information etc. as digital information is transmitted from ground control equipment, and the transmitted signal wave is received and demodulated by the on-vehicle control equipment of the train.

In general, in transmitting digital information, a method of detecting an error in the information, in the case where the content of the information has been destroyed or changed by a bit error, is performed wherein equipment on the transmission side transmits the information while affixing thereto a redundant code for error detection, such as a CRC (cyclic redundancy check) code, and the equipment which receives the transmitted information checks the contents of the error detecting code and the information so as to avoid using any erroneous information for processing.

Regarding a method for affixing such a redundant code to transmitted information, the official gazette of Japanese Patent Application Laid-open No. 1364725/1988, for example, discloses a redundant code processing method wherein transmission equipment forms a matrix by the use of information to-be-communicated and creates redundant codes in the row and column directions of the matrix, and then it transmits the resulting information; and, reception equipment similarly forms a matrix and creates redundant codes in the row and column directions of the matrix for the received information, and it correlates the created redundant codes with the received ones, so as to detect and correct an error in the received information.

In train control, for example, in a system where safety control is important, such as an automatic train control system (ATC system), it is required that the ground equipment should stop the output of information to the train in case of trouble in the transmission thereof, and it should allow the train to judge whether the trouble is in the ground equipment or whether the occurrence of the trouble is in the train, lest the train be operated with poor safety on account of repeated transmissions of the same information attributed to trouble in the ground equipment. In order to satisfy such a requirement, the ground equipment uses devices of higher reliability relative to the whole system. For this reason, the ground equipment becomes complicated in construction and is expensive.

As one method of curtailing the cost of a railway system, it is considered desirable to endow the ground equipment with a simple processing architecture. However, in a case where the processing, in which the information is repeatedly sent while being updated, as in the consecutive transmission mode, is executed by the use of such equipment, trouble might occur to bring about a state where information which has been transmitted previously is subjected to transmission processing in a current transmission procedure as if it were new information. On such an occasion, since error detection means for the CRC code or the like is an expedient used only for detecting a bit error in the information to-be communicated, no checking method based solely on the CRC code or the like can detect trouble in the equipment, except when information transmitted previously undergoes a bit error.

An object of the present invention is to realize a simple way of detecting trouble in the transmission path, and, further, to enhance the safety of train service based on automatic train control or the like, in a railway information transmission method and system wherein information is transmitted between control equipment on a train and control equipment on the ground by the consecutive transmission mode.

SUMMARY OF THE INVENTION

The present invention provides a technique wherein information is transmitted by a consecutive transmission mode between on-vehicle control equipment for a train running on a track and ground control equipment for administering the running of the train, in that a redundant code which is updated in accordance with a predetermined procedure every transmission processing period is affixed to information to-be-communicated, the information being then transmitted, and in that the redundant code which is contained in the received information is correlated with a redundant code which is created on the reception side and which is updated in accordance with a predetermined procedure.

Further, in a case where the correlation of the redundant codes results in disagreement, the result of the correlation is reported to personnel at the reception side, or it is outputted as a signal directly to means for coping with an emergency condition of the train.

DESCRIPTION OF THE PREFERRED EMBODIMENTS

Figure 1:
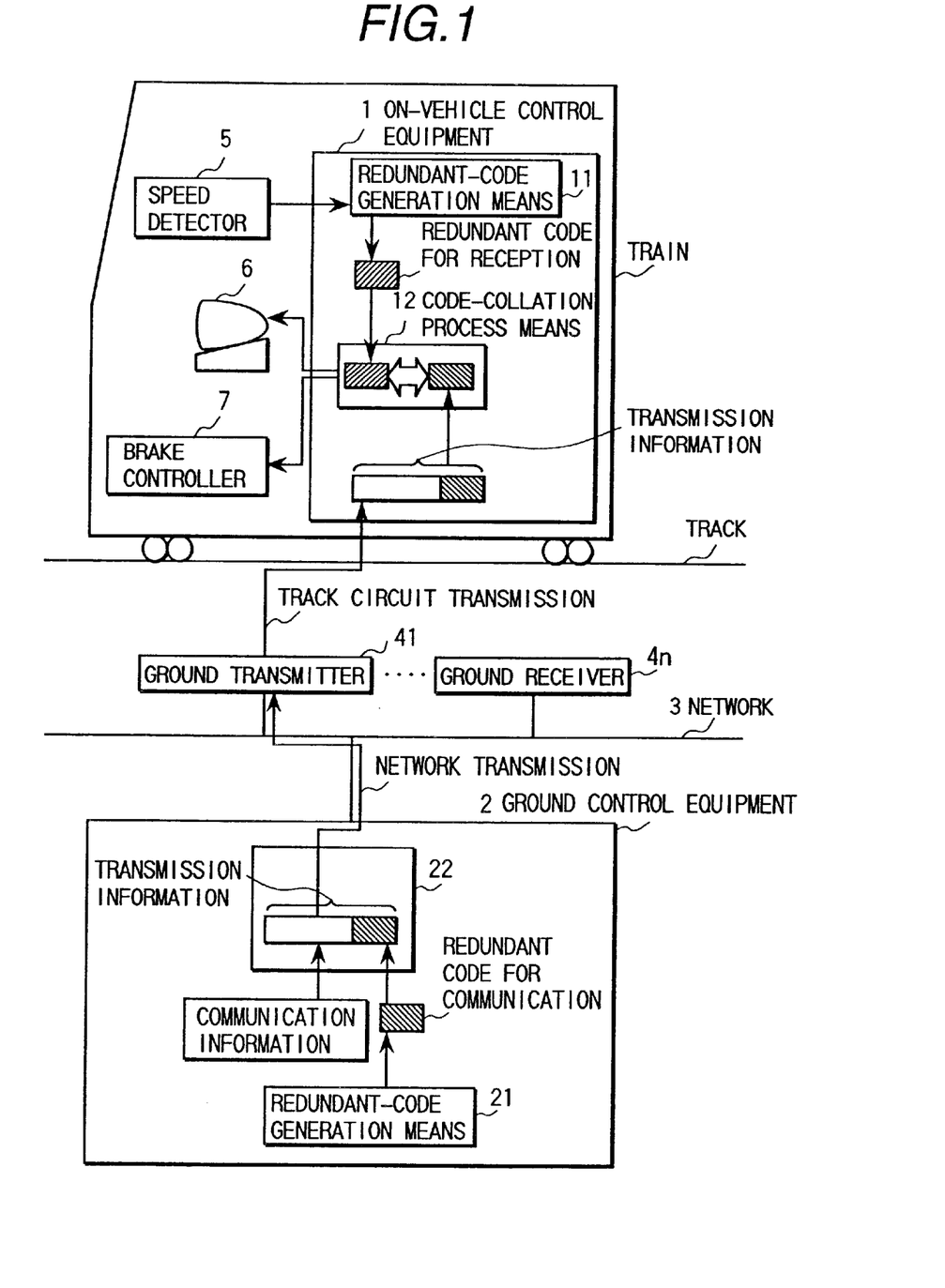
FIG. 1 is a block diagram relevant to transmission of information, showing an embodiment of the present invention.

Now, an embodiment of the present invention will be described as an example of the application thereof to the transmission system of an automatic train control system (ATC system) for a railway. FIG. 1 illustrates a block diagram relevant to transmission processing in the case where information is transmitted from ground control equipment to on-vehicle control equipment.

The on-vehicle control equipment 1 for controlling a train is installed on a train which runs on a track, while the ground control equipment 2 for administering the running of the train is installed on the ground. In the information transmission between both equipments, information is transmitted to a track circuit, using a consecutive transmission mode, through a plurality of ground transmitters/receivers 41–4n which are coupled with the ground control equipment 2 by a network 3.

Connected to the on-vehicle control equipment 1 are a speed detector 5 for detecting the speed of the train, a display unit 6, and a brake controller 7. The on-vehicle control equipment 1 includes therein redundant-code generation means 11 for generating a receiving side redundant code, which is updated in accordance with a predetermined procedure in response to receipt of the output of the speed detector 5, and code-correlation processing means 12 for correlating the receiving side redundant code with a communicating side redundant code which is affixed to transmission information transmitted from the ground control equipment 2. The signal output of the correlation means processing 12 is then sent to the display unit 6 or the brake controller 7 in correspondence with the result of the correlation.

On the other hand, the ground control equipment 2 includes therein redundant-code generation means 21 for generating the communicating side redundant code, which is updated in accordance with a predetermined procedure, and means 22 for affixing the communicating side redundant code, which is updated each time information generated by the redundant-code generation means 21 is transmitted, to communication information so as to form transmission information, the transmission information being subjected to network transmission to the plurality of ground transmitters/receivers 41–4n which are connected to the network 3.

Figure 2:
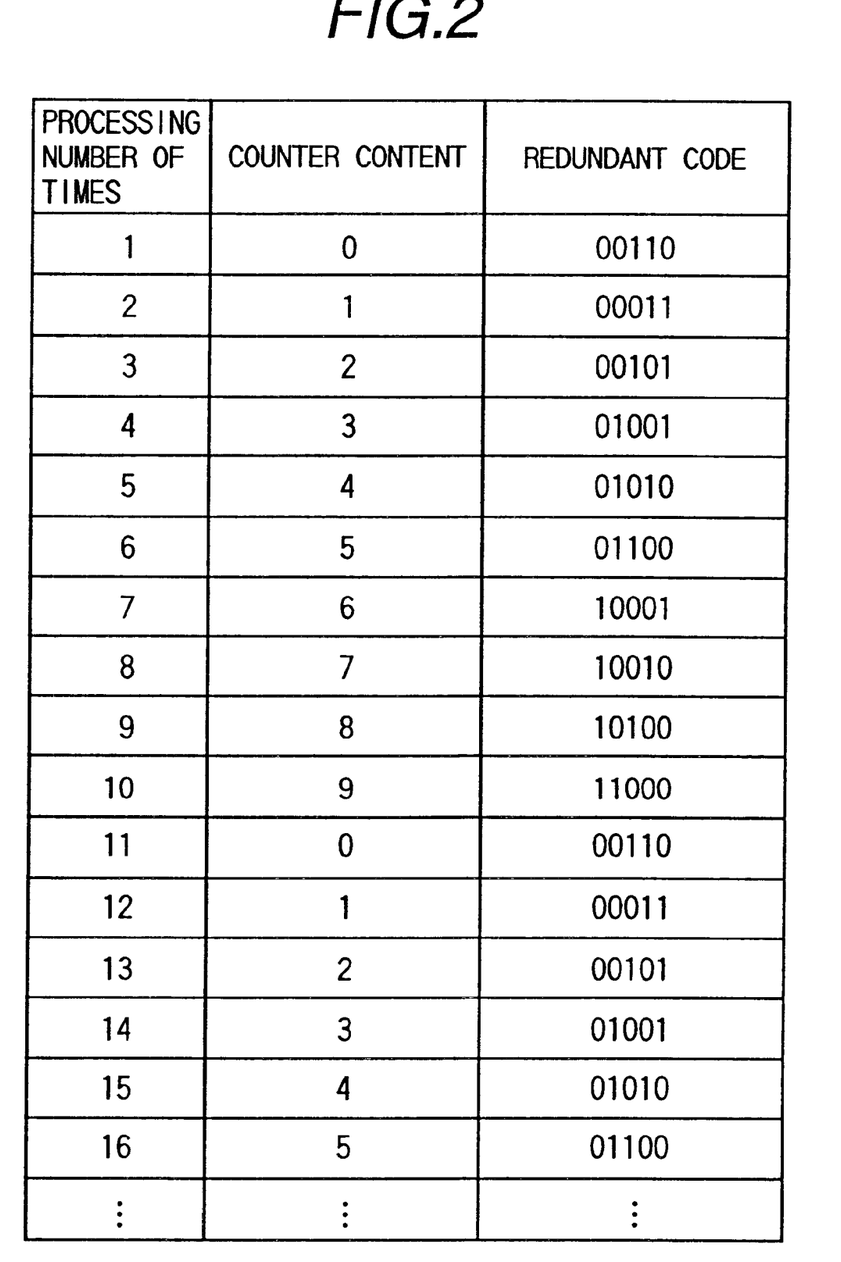
FIG. 2 is a diagram for use in elucidating the processing contents of redundant-code generation means depicted in FIG. 1.

Next, the processing contents of the redundant-code generation means 11, 21 will be described with reference to FIG. 2. Each of these means includes therein a counter whose count is reset at every tenth count, and whose content is updated each time the processing number of times is advanced. Since the redundant code is generated by expressing each of the numerical values 0–9 of the counter in terms of a "2-out-of-5" code (the mode in which "1's" are contained in the 5 bits without fail), the redundant code is also updated with each incrementing of the processing number of times in a pattern as shown in FIG. 2. Incidentally, the redundant-code generation means 11 carried on the vehicle senses when the train stops at, e. g., a station from the output of the speed detector 5, and it initializes or updates the counters included in the redundant-code generation means 11 on the vehicle and the redundant-code generation means 21 on the ground, on the basis of the sensed stop condition.

Next, transmission operations in accordance with this embodiment will be described. By the way, in this embodiment, a CRC code which is used for error detection based on a bit error arising in the course of transmission shall be affixed also to the communication information to-be-transmitted. Initially, since the content of the first communicating redundant code to be transmitted from the ground side is {00110} corresponding to the "0" state of the counter, the transmission information becomes as follows:

Transmission information={Communication information}+ {00110}+{CRC code}

This transmission information is sent from the ground control equipment 2 through the network 3 to the ground transmitters/receivers, which transfer the transmission information to the on-vehicle control equipment by way of the track circuit transmission.

The on-vehicle control equipment first checks the received transmission information on the basis of the CRC code. Subsequently, it correlates the redundant codes so as to confirm that the information to be communicated is correct data. In this way, the occurrence of any bit error in the transmission information during the transmission can be determined first by making a check based on the CRC code. Since the communicating side redundant code contained in the transmission information is subsequently correlated with the receiving side redundant code held in the on-vehicle control equipment, it can be confirmed during every transmission that the transmission information is correct information transmitted by the ground control equipment.

By way of example, the redundant code which the dn-vehicle control equipment first receives from the ground side has the content {00110} for the communicating side redundant code created in the ground control equipment 2. On the other hand, the receiving side redundant code is created in the on-vehicle control equipment during every reception, and the content thereof is {00110} corresponding to the "0" state of the counter therein. Thus, the contents of the communicating side redundant code and the receiving side redundant code agree, and so it can be confirmed that the transmission is correct.

In the next transmission, the value of the counter included in the ground control equipment 2 is updated to "1", and hence, the content of the communicating side redundant code is updated to {00011}. In consequence, the content of the redundant code in the transmission information also becomes {00011}. At the same time, the content of the redundant code in the on-vehicle control equipment 1 is also updated in correspondence with the value of the counter therein to become {00011}. As a result, the communicating side redundant code and the receiving side redundant code are found in the correlation processing to be in agreement, and it can therefore be confirmed that this transmission is also correct.

Meanwhile, in a case where either or both of the ground transmitter/receiver and the network 3 has/have developed a problem, the transmission information is not correctly transferred. There will be a description of the method of detecting trouble in the ground transmitter/receiver as well as in the network in this case. First, let's consider an occasion where the ground transmitter/receiver or the network has developed a problem and does not transmit information. On this occasion, the transmission of information does not occur, and hence, the presence of trouble can be determined from the fact that the period of time for which the on-vehicle control equipment does not receive transmission information is, at least, a predetermined duration.

Next, let's consider an occasion where the ground transmitter/receiver has developed trouble and repeatedly transmits the same transmission information as was transmitted before. On the occasion where trouble has occurred after the transmission of the transmission information corresponding to the content "1" of each counter, the content of the communicating side redundant code remains unchanged at {00110} corresponding to the counter content of "1". On the other hand, the counter in the on-vehicle control equipment is updated at the time of the reception processing, so that the content of the receiving side redundant code becomes {00101} corresponding to a counter content of "2", which is the updated value of the counter. In the transmission information succeeding the occurrence of the trouble, the information items in the on-vehicle control equipment become as follows:

Transmission information={Communication information}+{00011}+{CRC code}

Receiving side redundant code={00101}

Herein, a check based on the CRC code serves to detect only the presence of a bit error in the transmission information, so that the presence or absence of any other trouble cannot be detected. Since, however, the redundant codes which are updated every transmission period are employed in the correlation processing thereof, the updated states of the respective transmission information items can be checked. In consequence of the correlation processing, it is determined that the content of the redundant code contained in the transmission information disagrees with the content of the redundant code held in the on-vehicle control equipment. Accordingly, it is determined that the received transmission information is not information correctly transmitted from the ground control equipment, and it can be discerned that trouble has occurred in either or both of the network and the ground transmitter/receiver which constitute a midway transmission path.

Thus, there has been described a method which uses the redundant codes to discriminate whether the transmission information received is information correctly transmitted. On the occasion where the transmission information is not information correctly transmitted, the on-vehicle control equipment is reduced to a state in which it cannot obtain data that is to be obtained in the form of transmission information from the ground control equipment. If the train runs with such a state left intact, the safety thereof cannot be ensured for the reason that the distance to a preceding train moving in the same traveling direction as the pertinent train is not known. Therefore, on condition that the above state continues for, at least, a predetermined duration, the on-vehicle control equipment executes a processing necessary for keeping the pertinent train in a safe state, such as by displaying the occurrence of trouble in the transmission path on the display unit mounted in the cab of the train, thereby to report the situation to the driver of the train, or by issuing a braking command to means for coping with an emergency condition of the train (for example, the brake controller), thereby to stop the train.

Next, a case will be described wherein information items are transmitted from the ground control equipment to the on-vehicle control equipment of a plurality of trains.

The ground control equipment creates communication information items for a plurality of trains, for example, respective trains #1 and #2, and it transmits transmission information, including train Nos., redundant codes and CRC codes; as communication information items to the respective trains #1 and #2.

Thus far, cases have been considered wherein information is transmitted from the ground control equipment to the on-vehicle control equipment. In a case where information is transmitted conversely from the on-vehicle control equipment to the ground control equipment, merely the direction of the transmission as shown in FIG. 1 changes, and the construction of the control system is not basically different. In this case, however, the code correlating processing means 12 is disposed in the ground control equipment. Herein, the ground side is furnished with means for operating, when the state in which the correlation processing of the redundant code received from the on-vehicle control equipment results in disagreement continuously for, at least, a predetermined duration, so as to execute a processing necessary for keeping the train in a safe state, such as by displaying the occurrence of the trouble in the transmission path on a display unit mounted in the ground control equipment, thereby to report the situation to the operator of the ground control equipment, or by issuing a command to means for coping with the emergency of the train (for example, giving stop indications to signal apparatuses installed within the control range of the ground control equipment), thereby to stop the train.

Next, there will be explained the manner of initializing the redundant codes generated in the on-vehicle control equipment and the ground control equipment. In order to normally transmit information between points on the vehicle and points on the ground, the contents of the respective counters provided within the redundant-code generation means in the on-vehicle control equipment and the ground control equipment need to be in agreement. A process for effecting initialization of these counters is therefore executed by bringing the counters in both code generation means into agreement before the transmission is started between the control equipments.

Incidentally, during execution of the process for bringing the respective counter contents into agreement, the code correlation processing for the transmission information cannot be executed, and the safety of the train might be in jeopardy. As a condition for the execution of the process for bringing the respective counter contents into agreement, therefore, it is necessary to confirm that the train is in a safe state. To this end, the process for bringing the contents of both counters into agreement is carried out only after the train stops in compliance with a stop indication at the station, a signal apparatus, or the like, which has been confirmed by detecting the speed of the train. Besides, in a case where both of the counters are forcibly brought into agreement, the process is carried out after the train has been stopped by sending a command for a stop indication to the signal apparatus from the ground control equipment.

Figure 3:
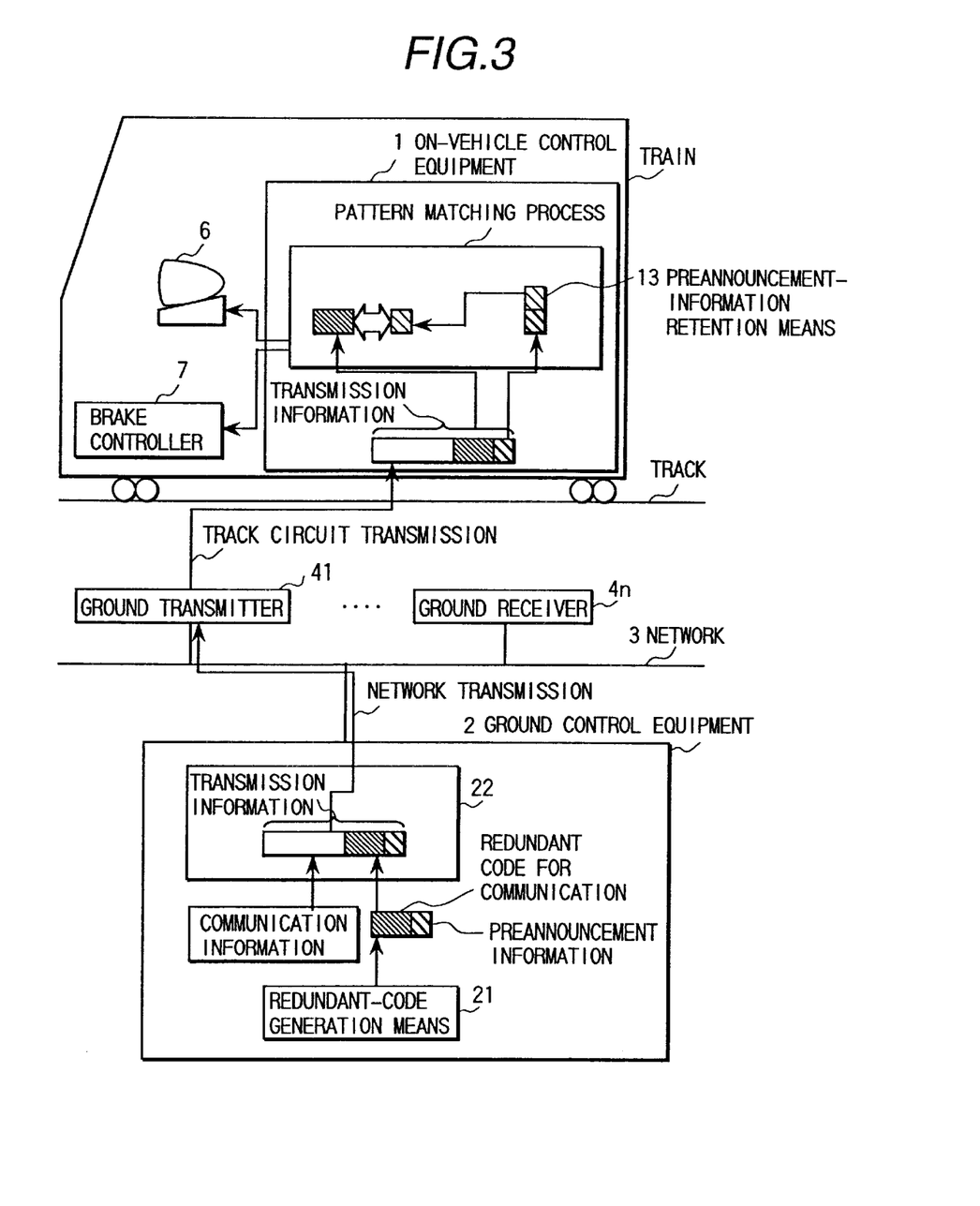
FIGS. 3, 4 and 5 are block diagrams of information transmission systems, each showing a respective embodiment of the present invention.

FIG. 3 is a block diagram of an information transmission system representing another embodiment of the present invention. The point of difference from the embodiment of FIG. 1 is that, in affixing a redundant code to transmission information, the ground control equipment affixes, as preannouncement information, part of a redundant code which is to be affixed to transmission information at the next transmission timing, and it creates a CRC code for the information including the preannouncement information, so as to transmit the resulting information to on-vehicle control equipment as transmission information. The configuration of the transmission information based on this feature becomes as follows:

Transmission information={Communication information}+{Redundant code}+{Preannouncement information}+{CRC code}

By way of example, let's consider a case where the counter of the redundant-code generation means 21 included in the ground control equipment has a count of "1". At this time, the content of the redundant code is {00011}. Since the counter will be updated to "2" at the next transmission timing, the content of the redundant code at that time will become {00101}. Assuming that the content of the preannouncement information is the whole redundant code of the next transmission timing, the preannouncement information for the counter content "1", becomes {00101} corresponding to the counter content of "2", and the transmission information becomes as follows:

Transmission information={Communication information}+{00011}+{00101}+{CRC code}

The on-vehicle control equipment stores the preannouncement information contained in the received transmission information preannouncement information retention means 13. Accordingly, the content of the preannouncement-information retention means 13 is as follows:

Preannouncement-information retention means={00101}

At the next transmission timing, the content of the counter in the ground control equipment 2 is updated to "2", and hence, the preannouncement information becomes {01001} corresponding to a counter content of "3". Therefore, the transmission information becomes as follows:

Transmission information={Communication information}+{00101}+{01001}+{CRC code}

In the on-vehicle control equipment, the redundant code contained in the received transmission information is correlated with the content of the preannouncement-information retention means 13. At this time, the content of the redundant code is {00101}, and that of the preannouncement-information retention means 13 is {00101}. As a result, the values being correlated are in agreement, and it can therefore be confirmed that the current transmission information is information correctly-updated with respect to the last transmission information.

Now, let's consider a case where either or both of a network and a ground transmitter/receiver has/have developed a problem, and where the transmission information sent at the last transmission timing is repeatedly transmitted. When the transmission information corresponding to the counter content "1", is repeated without sending the transmission information with the value of the counter updated to "2", the transmission information which the on-vehicle control equipment receives is as follows:

Transmission information={Communication information}+{00011}+{00101}+{CRC code}

The content of the redundant code at this time is {00011}, and that of the preannouncement-information retention means 13 is {00101}. In this manner, the correlation between the content of the preannouncement-information retention means 13 and the redundant code contained in the transmission information results in a disagreement. It can consequently be found that the transmission information has not been correctly sent.

Figure 4:
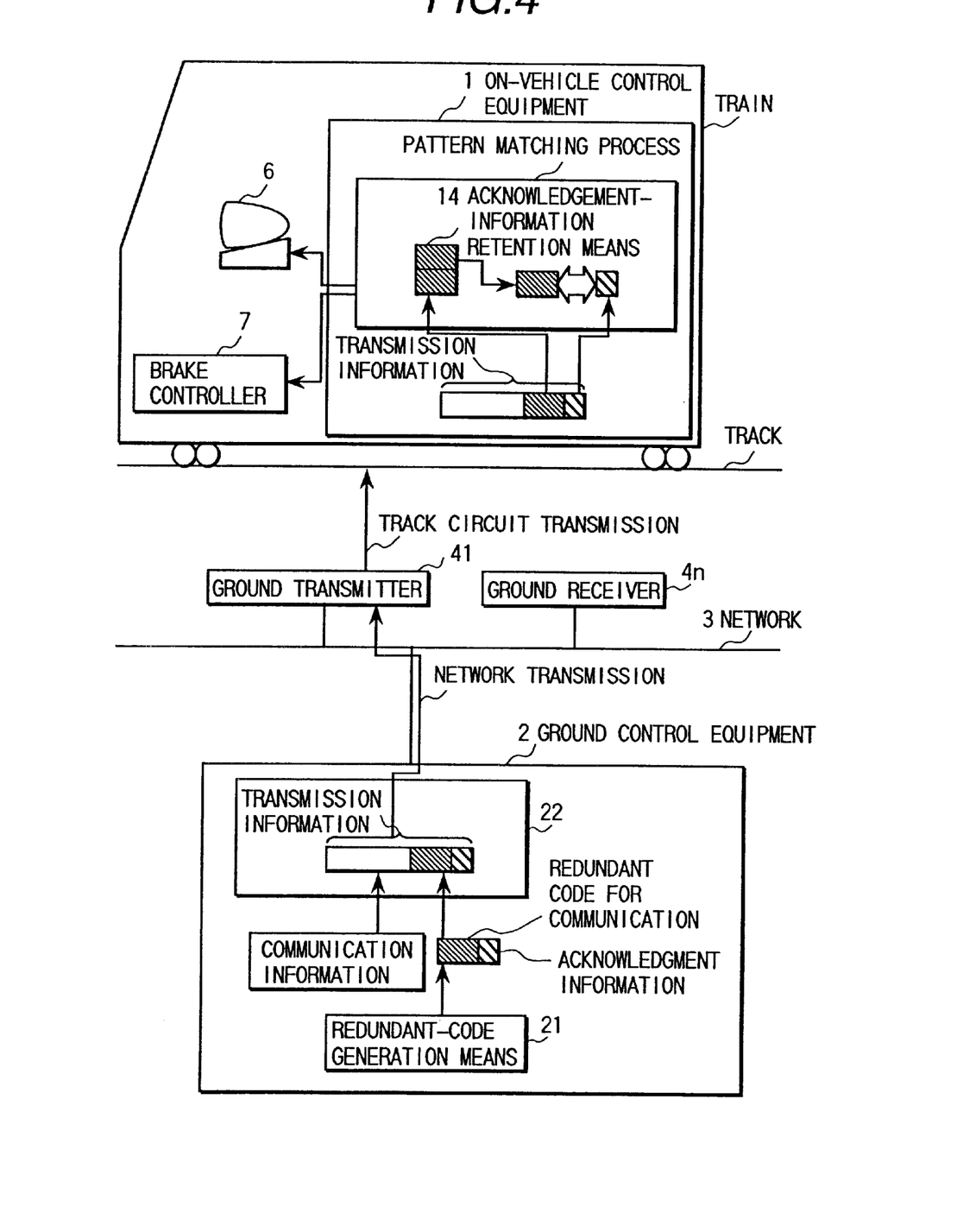

FIG. 4 is a block diagram of an information transmission system representing another embodiment of the present invention. The point of difference from FIG. 1 is that, in affixing a redundant code to transmission information, the ground control equipment affixes as acknowledgement information at least part of a redundant code which was affixed to the transmission information at the last transmission timing, and it creates a CRC code for the information including the acknowledgement information, so as to transmit the resulting information to on-vehicle control equipment as the transmission information. Thus, the structure of the transmission information becomes as follows:

Transmission information={Communication information}+{Redundant code}+{Acknowledgement information}+{CRC code}

By way of example, let's consider a case where the counter of the redundant-code generation means included in the ground control equipment has a count of "3". At this time, the content of the redundant code is {01001}. Since the counter had a count "2" at the last transmission timing, the content of the redundant code at that time was {00101}. Assuming that the content of the acknowledgement information is represented by the whole redundant code of the last transmission timing, the acknowledgement information for the counter content of "3" becomes {00101} corresponding to the counter content of "2", and the transmission information becomes as follows:

Transmission information={Communication information}+{00101}+{00101}+{CRC code}

The on-vehicle control equipment retains the redundant code contained in the received transmission information using acknowledgement-information retention means 14. Accordingly, the content of the acknowledgement-information retention means is as follows:

Acknowledgement-information retention means {0100}

At the next transmission timing, the content of the counter is updated to "4", and hence, the acknowledgement information becomes {01001} corresponding to the counter content of "3". Therefore, the transmission information becomes as follows:

Transmission information={Communication information}+{01010}+{01001}+{CRC code}

Here, the on-vehicle processing equipment correlates the acknowledgement information contained in the received transmission information and the content of the acknowledgement-information retention means 14. The content of the acknowledgement information is {01001}, and that of the acknowledgement-information retention means 14 is {01001}. As a result, both of the values are in agreement, and it can therefore be confirmed that the last transmission information was information correctly updated with respect to the current transmission information.

Now, let's consider a case where either or both of a network and a ground transmitter/receiver has/have developed a problem, and where the transmission information sent at the last transmission timing is repeatedly transmitted. When the transmission information corresponding to the counter content of "3", is repeated without sending the transmission information with the value of the counter updated to "4", the transmission information which the bn-vehicle control equipment receives is as follows:

Transmission information {Communication information}+{01001}+{00101}+{CRC code}

The content of the acknowledgement information at this time is {00101}, whereas the content of the acknowledgement-information retention means 14 is {01001}. In this manner, the correlation between the content of the acknowledgement-information retention means 14 and the redundant code contained in the transmission information results in a disagreement. It can consequently be found that the updated state of the transmission information is not correct.

Figure 5:
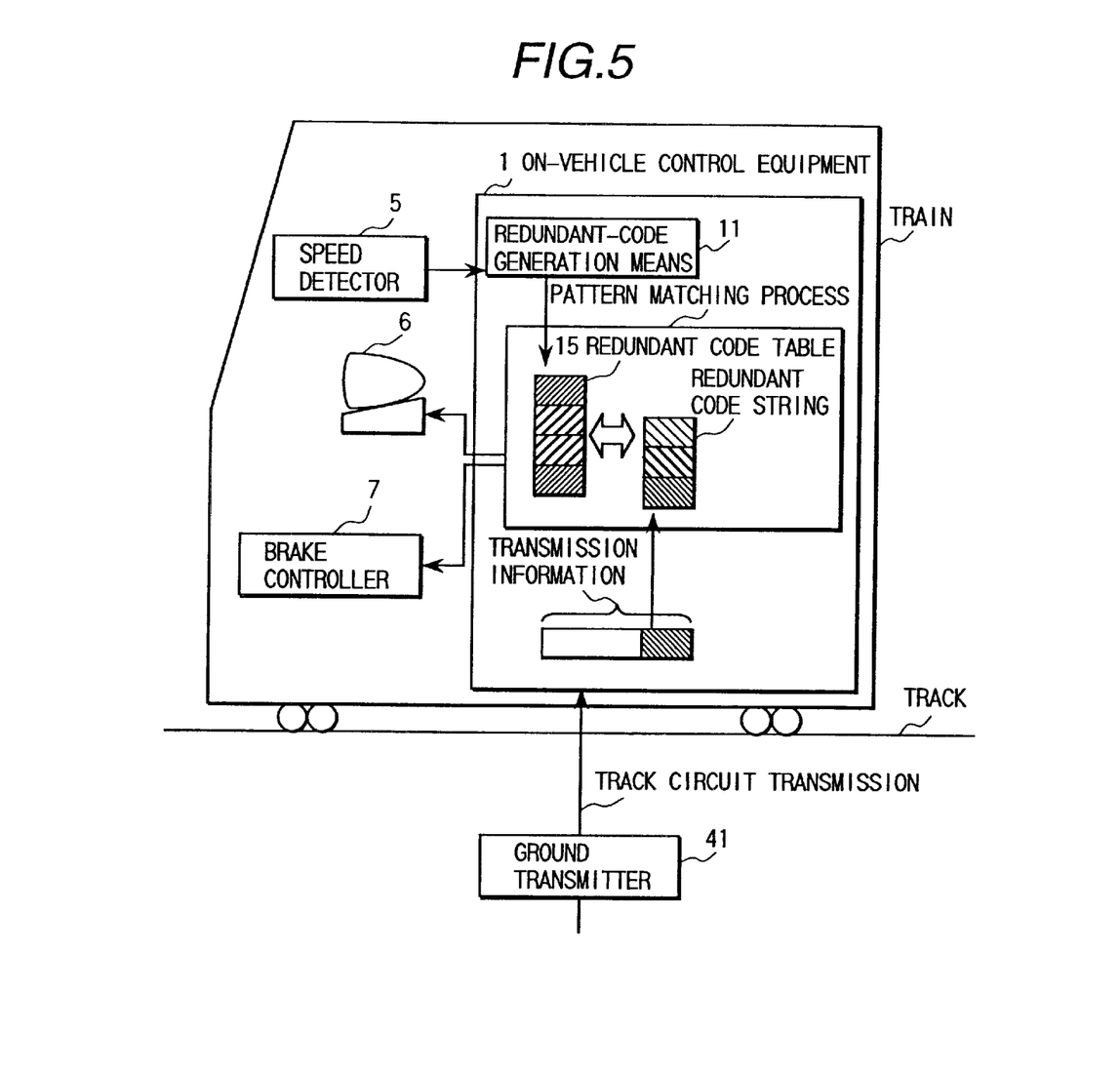

FIG. 5 is a block diagram of an information transmission system representing another embodiment of the present invention. The feature of this embodiment accomplishes the same object as the embodiment of FIG. 3 or FIG. 4 and concerns the expedient for confirming the updated state of the redundant code contained in the received transmission information, every reception, so that only the on-vehicle side of the system which serves as a reception side is illustrated in FIG. 5. The point of difference from FIG. 3 or FIG. 4 is that a redundant code string based on redundant codes contained in transmission information items at a plurality of successive transmission timings is created, whereupon the created string is subjected to pattern matching using a redundant code table 15 which has been created beforehand. This method will be described in more detail below.

Figure 6:
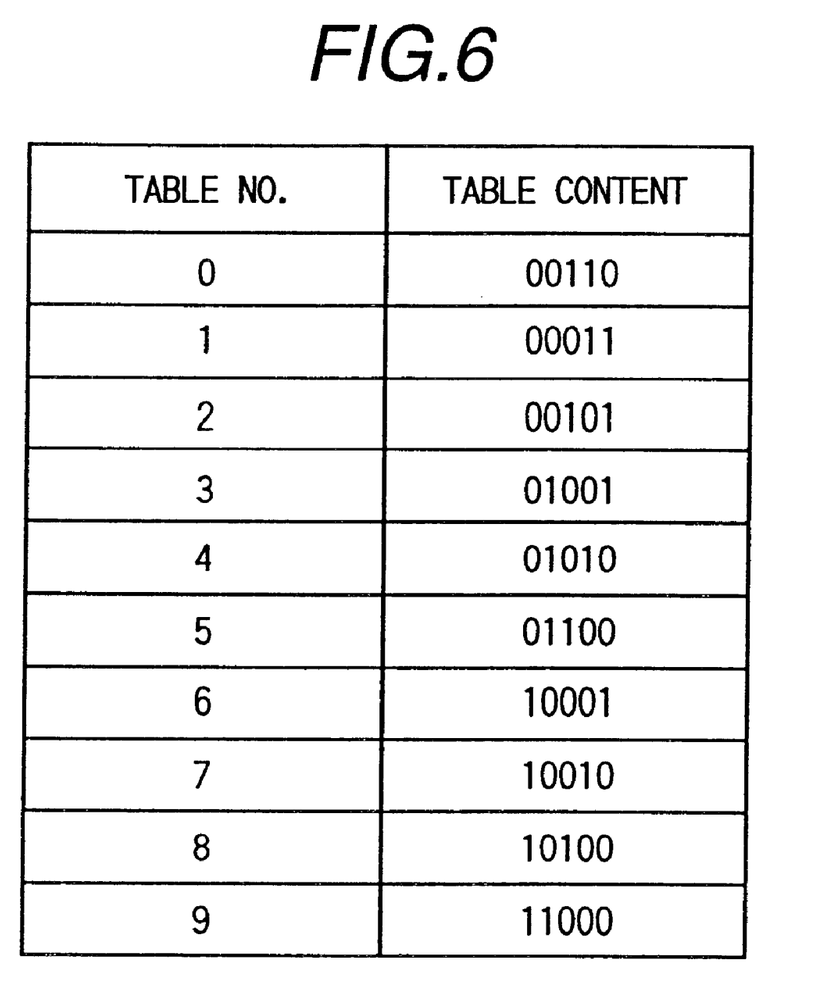
FIG. 6 is a diagram of a redundant code table included in the embodiment of FIG. 5.

Incidentally, although the case of transmitting information from ground control equipment to on-vehicle control equipment will be exemplified in the embodiment of FIG. 5, the same holds true also for the converse case. First, in the on-vehicle control equipment, the redundant code table as shown in FIG. 6 is created by the redundant-code generation means 11 (shown in FIG. 1) when processing is started. The table is such that the contents thereof are prepared in correspondence with table Nos., and the table No. and the table content correspond respectively to the counter content and the redundant code indicated in FIG. 2.

The operation of this embodiment will be explained. In sending control information to the on-vehicle control equipment, the ground control equipment affixes a communicating side redundant code, which is created by redundant-code generation means included in this ground control equipment, and a CRC code for the control information. Assuming now that the content of a counter included in the redundant-code generation means is "1", the communicating side redundant code at that time is {00011} in view of FIG. 2. Accordingly, the contents of the transmission information become as follows:

Transmission information={Communication information}+{00011}+{CRC code}

Thus, the on-vehicle control equipment first checks for the presence or absence of the occurrence of any bit error in the received transmission information on the basis of the CRC code. Subsequently, it extracts the communicating side redundant code and adds the extracted code to a redundant code string, thereby to update the redundant code string.

Assuming that the contents of the redundant code string consist of communicating side redundant codes corresponding to three successive transmission processings, the contents of the communicating side redundant codes in the next transmission processing and the still next transmission processing are added to the redundant code string. Since the contents of the communicating side redundant codes at these times correspond to the content for a counter value of "2" and the content for a counter value "3", they are {00101} and {01001}, respectively. Accordingly, the redundant code string becomes as follows:

Redundant code string={00011}+{00101}+{00101}.

This redundant code string is correlated with the contents of the redundant code table shown in FIG. 6, thereby to determine if an agreeing pattern exists. In this case, table contents corresponding to table Nos. {1}, {2} and {3} agree as a pattern, and it can therefore be confirmed that transmission information items corresponding to the receiving side redundant codes, which are represented by the contents of the redundant code string, are items that have been updated correctly.

Here, let's consider a case where the ground transmitter/receiver has developed a problem, and where the transmission information corresponding to the counter content "2" was transmitted to the on-vehicle control equipment at the timing for transmitting the transmission information corresponding to a counter content "3". On this occasion, the contents of the communicating side redundant codes contained in the transmission information items received by the on-vehicle control equipment are {00011}, {00101} and {00101} in succession. Accordingly, the contents of the redundant code string become as follows:

Redundant code string={00011}+{00101}+{001011}

In the on-vehicle control equipment, a matching process based on the redundant code string is executed, thereby to determine whether or not a pattern agreeing with the redundant code string exists in the redundant code table shown in FIG. 6. Herein, an agreeing pattern does not exist, and it can therefore be confirmed that the transmission information items are ones which have not been correctly updated at the respective transmission timings.

Although, in the foregoing, various embodiments of the present invention have been described as employing track circuit transmission as the transmission medium, it is a matter of course that similar effects are attained even when the present invention is applied to a case of transmitting information by radio.

According to the present invention, as described above, a redundant code which is updated for every transmission is affixed to transmission information in the consecutive transmission mode between on-vehicle control equipment and ground control equipment, and the affixed code is correlated, whereby trouble in the transmission path can be simply found, and the safety of a train service can be enhanced by controlling a train using an automatic train control system or the like on the basis of the result of such correlation. Accordingly, the present invention is suitable for applications in the field of railway system control in which the greatest importance is attached to the safety of the vehicles being controlled.

What is claimed is:

1. In a railway information transmission system wherein information transmission between on-vehicle control equipment for a train operating on a track and ground control equipment for administering an operation of the train is performed by a consecutive transmission mode between a transmission side and a reception side of the system through a plurality of ground transmitters/receivers which are coupled with the ground control equipment by a network, said railway information transmission system comprising:

each one of said ground control equipment and said on-vehicle control equipment includes therein redundant code generation means for generating a redundant code which is updated in accordance with a predetermined procedure, and that the transmission side is furnished with means for affixing the redundant code, which is updated each time information is transmitted from said redundant-code generation means, to communication information so as to form transmission information, while the reception side is furnished with means for updating said redundant code of said redundant-code generation means on said reception side each time the transmission information is received, and also with means for performing logical operation on said redundant code affixed to said transmission information and another redundant code updated by said reception side itself and further, when said ground control equipment transmits transmission information to said on-vehicle control equipments of a plurality of trains, said ground control equipment creates separate communication information items for the plurality of trains.

2. A railway information transmission system according to claim 1, wherein when the logical operation by said means for performing logical operation on the redundant codes results in disagreement, means for reporting the result of the logical operation is caused to transfer said logical operation result to situation responsive means.

3. A railway information transmission system according to claim 1, further including means for outputting a result of the logical operation as a signal and transferring the signal to means for coping with an emergency condition of the train, on condition that said logical operation by said means for performing logical operation on the redundant codes results in disagreement.

4. A railway information transmission system according to claim 1, further including means for executing an initialization process which starts updating the redundant codes in said redundant-code generation means, when the train is at a stop in compliance with a stop indication.

5. A railway information transmission system according claim 1, further including means for commanding signal apparatuses, which are installed within a control range of said ground control equipment, to present stop indications, in order to execute an initialization process which starts updating the redundant codes produced by said redundant-code generation means.

6. A railway information transmission system according to claim 1, wherein each of the redundant codes generated by said redundant-code generation means contains at least part of another redundant code to be subsequently generated, as preannouncement information, and wherein at least one of said ground control equipment and said on-vehicle control equipment operating at the reception side retains, at least, the preannouncement information contained in the communicating redundant code received last and performs a logical operation on the retained preannouncement information and the content of a communicating redundant code received anew.

7. A railway information transmission system according to claim 1, wherein each of the redundant codes generated by said redundant-code generation means contains part of another redundant code generated last, as acknowledgment information, and wherein at least one of said ground control equipment and said on-vehicle control equipment operating at the reception side retains, at least, the acknowledgment information contained in the communicating redundant code received last and performs a logical operation on the retained acknowledgment information and the content of a communicating redundant code received anew.

8. A railway information transmission system according to claim 1, characterized in that at least one of said ground control equipment and said on-vehicle control equipment includes means for creating and retaining a logical operation redundant-code table at a start of processing beforehand, the table containing the redundant codes which are to be outputted by the redundant-code generation processes, and means for performing a logical operation on a changing state of a reception information string based on the redundant codes which are contained in, at least, a plurality of reception information items, and the contents of the logical operation redundant-code table.

9. A railway information transmission system according to claim 1, wherein said on-vehicle control equipment at the reception side includes means for accepting a redundant-code table from said ground control equipment at the transmission side and then retaining said table therein before a start of processing, the table being based on the redundant codes which are to be outputted by said redundant-code generation means in said ground control equipment at the transmission side, and means for performing a logical operation on a changing state of a reception information string based on the redundant codes which are contained in, at least, a plurality of reception information items, and the contents of the redundant-code table.

10. A railway information transmission system according to claim 1, wherein the reception side is formed by the ground control equipment and the transmission side is formed by the on-vehicle control equipment, and wherein each of said reception side and transmission side generate a redundant code.

11. A railway information transmission system according to claim 1, wherein the reception side is formed by the on-vehicle control equipment and the transmission side is formed by the ground control equipment, and wherein each of said reception side and transmission side generate a redundant code.

12. In a railway information transmission method wherein information is transmitted by a consecutive transmission mode between on-vehicle control equipment for a train operating on a track and ground control equipment for administering an operation of the train, a railway information transmission method comprising:

affixing a first redundant code which is updated in a predetermined procedure every transmission processing to information to-be-communicated;

transmitting the information; and performing a logical operation on the first redundant code which is contained in the received information and a second redundant code which is created on a reception side and which is updated in another predetermined procedure.

13. In a railway information transmission system wherein information transmission between on-vehicle control equipment for a train operating on a track and ground control equipment for administering an operation of the train is performed by a consecutive transmission mode between a transmission side and a reception side of the system through a plurality of ground transmitters/receivers which are coupled with the ground control equipment by a network, said railway information transmission system comprising:

each one of said ground control equipment and said on-vehicle control equipment includes therein redundant-code generation means for generating a redundant code which is updated in accordance with a predetermined procedure, and that the transmission side is furnished with means for affixing the redundant code, which is updated each time information is transmitted from said redundant-code generation means, to communication information so as to form transmission information, while the reception side is furnished with means for updating said redundant code of said redundant-code generation means on said reception side each time the transmission information is received, and also with means for performing logical operation on said redundant code affixed to said transmission information and another redundant code updated by said reception side itself.

14. A railway information transmission system according to claim 4, wherein when the logical operation by said means for performing logical operation on the redundant codes results in disagreement, means for reporting the result of the logical operation is caused to transfer said performed logical operation result to situation responsive means.

15. A railway information transmission system according to claim 4, further including means for outputting a result of the logical operation as a signal and transferring the signal to means for coping with an emergency condition of the train, on condition that said logical operation by said means for performing a logical operation on the redundant codes results in disagreement.

16. A railway information transmission system according to claim 4, further including means for executing an initialization process which starts updating the redundant codes in said redundant-code generation means, when the train is at a stop in compliance with a stop indication.

17. A railway information transmission system according to claim 4, further including means for commanding signal apparatuses, which are installed within a control range of said ground control equipment, to present stop indications, in order to execute an initialization process which starts updating the redundant codes produced by said redundant-code generation means.

18. A railway information transmission system according to claim 4, wherein each of the redundant codes generated by said redundant-code generation means contains at least part of another redundant code to be subsequently generated, as preannouncement information, and wherein at least one of said ground control equipment and said on-vehicle control equipment operating at the reception side retains, at least, the preannouncement information contained in the communicating redundant code received last and performs a logical operation on the retained preannouncement information and the content of a communicating redundant code received anew.

19. A railway information transmission system according to claim 4, wherein each of the redundant codes generated by said redundant-code generation means contains at least part of another redundant code generated last, as acknowledgment information, and wherein at least one of said ground control equipment and said on-vehicle control equipment operating at the reception side retains, at least, the acknowledgment information contained in the communicating redundant code received last and performs a logical operation on the retained acknowledgment information and the content of a communicating redundant code received anew.

20. A railway information transmission system according to claim 4, wherein at least one of said ground control equipment and said on-vehicle control equipment includes means for creating and retaining a logical operation performing redundant-code table at a start of processing beforehand, the table containing the redundant codes which are to be outputted by the redundant-code generation processes, and means for performing logical operation on a changing state of a reception information string based on the redundant codes which are contained in, at least, a plurality of reception information items, and the contents of the logical operation performing redundant-code table.

21. A railway information transmission system according to claim 4, wherein said on-vehicle control equipment at the reception side includes means for accepting a redundant-code table from said ground control equipment at the transmission side and then retaining said table therein before a start of processing, the table being based on the redundant codes which are to be outputted by said redundant-code generation means in said ground control equipment at the transmission side, and means for performing logical operation on a changing state of a reception information string based on the redundant codes which are contained in, at least, a plurality of reception information items, and the contents of the redundant-code table.

22. A railway information transmission system according to claim 3, wherein said first and second redundant codes are the same.

23. A railway information transmission system according to claim 3, wherein a reception side is formed by the ground control equipment and a transmission side is formed by the on-vehicle control equipment, and wherein each of said reception side and transmission side generate a redundant code.

24. A railway information transmission system according to claim 3, wherein a reception side is formed by the on-vehicle control equipment and the transmission side formed by the ground control equipment, and wherein each of said reception side and transmission side generate a redundant code.

25. A railway information transmission system according to claim 4, wherein the reception side is formed by the ground control equipment and the transmission side is formed by the on-vehicle control equipment, and wherein each of said reception side and transmission side generate a redundant code.

26. A railway information transmission system according to claim 4, wherein the reception side is formed by the on-vehicle control equipment and the transmission side is formed by the ground control equipment, and wherein each of said reception side and transmission side generate a redundant code.

* * * * *